April 14, 1970     H. T. HALIBRAND     3,505,894
REVERSIBLE SHAFT TRANSMISSION
Filed Aug. 8, 1968     2 Sheets-Sheet 1
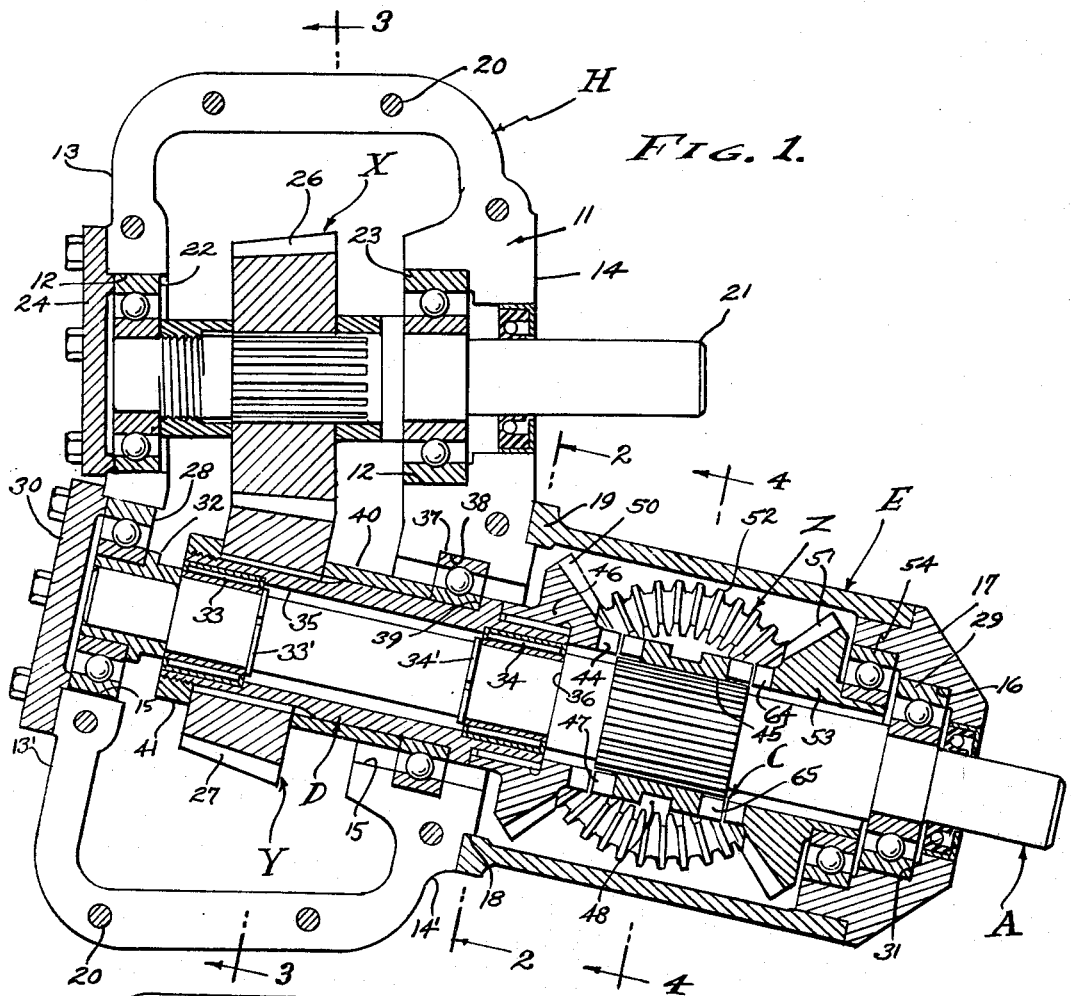
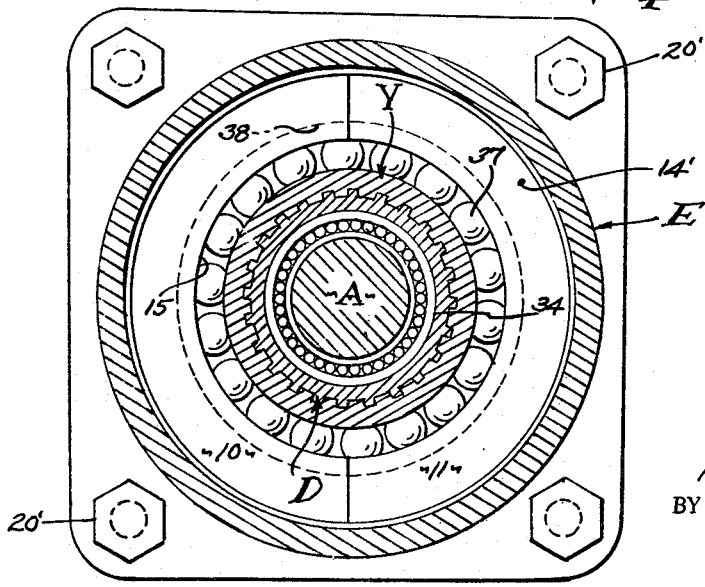
INVENTOR.
HENRY T. HALIBRAND
BY
AGENT

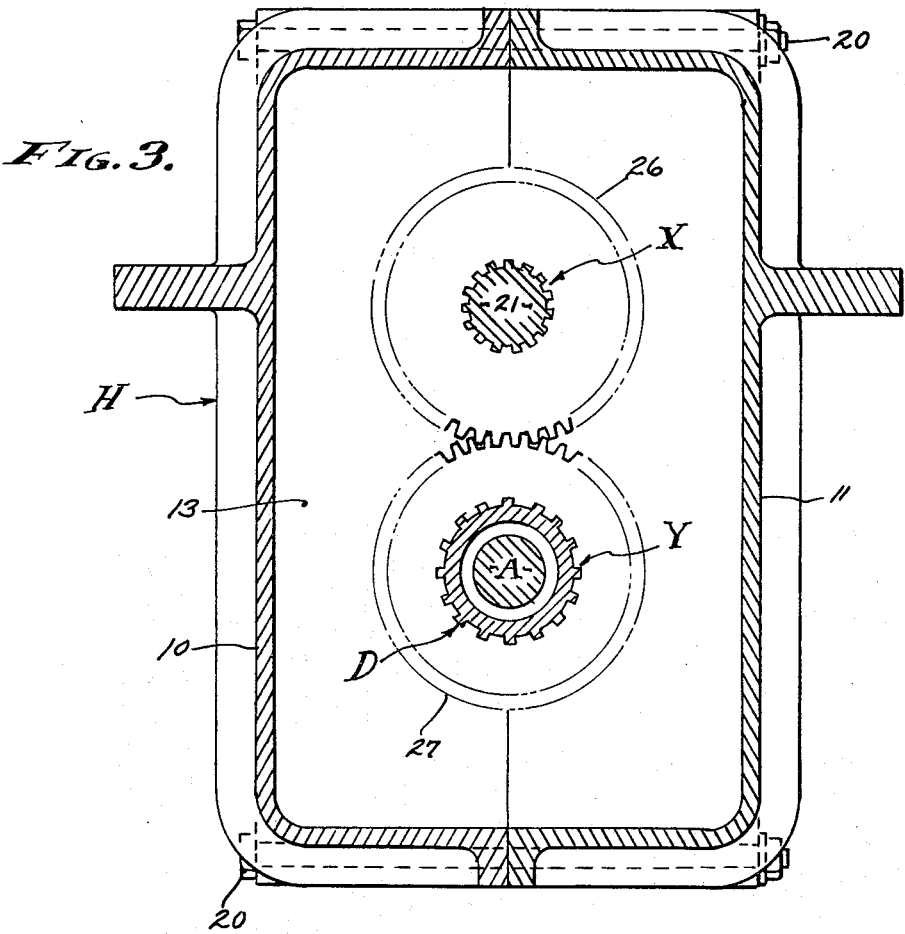
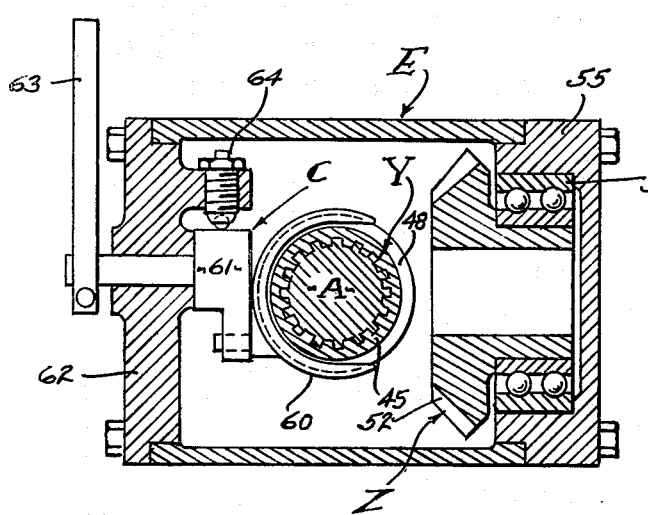
INVENTOR.
HENRY T. HALIBRAND
BY
AGENT

UNITED STATES PATENT OFFICE

3,505,894
Patented Apr. 14, 1970

3,505,894
REVERSIBLE SHAFT TRANSMISSION
Henry T. Halibrand, 6469 Nancy St.,
Los Angeles, Calif. 90045
Filed Aug. 8, 1968, Ser. No. 751,279
Int. Cl. B63h *1/14;* F16h *3/14, 57/02*
U.S. Cl. 74—379                                          16 Claims

ABSTRACT OF THE DISCLOSURE

A transmission especially suited for marine use wherein a propeller driving countershaft is engaged and disengaged or reversed as to rotation, and provides an angle drive with or without speed change to the driven countershaft that extends reversely with respect to a driving power shaft, and wherein the said countershaft carries a surrounding drive shaft having the transmission gearing thereon and adapted to absorb the axial thrust thereof independent of the axial thrust imposed upon the countershaft by the propeller thrust.

---

Transmissions of the type and for the purpose under consideration are characterized by direct and positive engagement of jaw clutches, and it is the propeller driving shaft of the transmission that is engaged, disengaged and reversed as to rotation. For engagement and disengagement only, reference is to an "in and out transmission"; and for reversibility with a neutral position, reference is to a "reversible transmission." The advantage of these jaw clutch transmissions is compactness with high torque capability, and all of which is highly desirable in an angle drive wherein there is a countershaft extending reversely beneath a driving power shaft, space being at a premium. Also, speed change, whether an increase or a decrease is a requirement in such transmissions, and all of which is provided for in the transmission herein disclosed.

The prior art transmissions that fit the above description involve countershafts that are split or sectional, one section journaled in a primary housing and the other journaled in a secondary housing. It is common practice to accomplish the speed change in the primary housing which journals the driving powered shaft and the said one section of the countershaft, these two shafts running continuously with a prime mover that drives the power shaft. The said other shaft is then piloted into the end of said one shaft so as to extend axially thereof and into a seconary housing that accommodates the engagement, disengagement and/or reverse means. The secondary housing is joined to the primary housing with bearings to journal said other shaft, and with bearings to journal a reverse pinion gear and reverse drive gear. Problems arise, therefore, in the absorption of thrust loads both radially and axially, imposed by the various gear engagements, and imposed by opposite propeller thrusts Absorption of thrusts is complicated by the sectional shafting, which requires the use of thrust bearings between the shaft sections, or alternately for example the absorption of all thrust of said other shaft on one rearmost bearing; and as a result the various thrust loads are intermingled and not efficiently relegated. These are the problems solved by the present invention wherein an improved transmission is provided.

Assembly and the adjustments of gear engagements becomes a problem in the usual gear box of the type under consideration, since it is usually necessary to sequentially install the individual parts into the separate housings followed by marriage of the two major assemblies, and all of which involves various parts and precise adjustments. Fundamentally, it is box-type housings with covers that are employed in the usual transmission and which require the separate and individual assembly of parts into the one or two major assemblies involved. Such assembly operations are not always conducive to efficient practices, and it is an object of this invention to advantageously employ a longitudinally split gear case that involves two separable half-shells that embrace completed assemblies. However, practical production of gear cases in general restricts the axial extent of bores therein, all of which involves the maintenance of precision and quality. Therefore, it is the correlation of a countershaft assembly and power shaft assembly in a longitudinally split half-shell housing which is the general object of the present invention, and with the further provision of a housing extension that carries the controlled section of the countershaft that projects from the half-shell housing, and all of which reduces the bore lengths in the housings and which is conducive to precision.

An object of this invention is to provide a reversible shaft transmission of the character above referred to, wherein both the power shaft and the countershaft are assembled as units preceding their association and relative adjustment to each other in a housing, advantage being taken of the half-shell housing concept, and with the provision of minimized bore length in the housing and extension thereof.

Another object of this invention is to provide a transmission of the type under consideration that separates the axial gear and clutch thrusts from the axial propeller thrusts, and with said thrusts isolated and relegated to certain bearings especially suited therefor. With the present transmission the countershaft is sectional and comprised of a propeller shaft with a tubular drive shaft journaled thereon by radial thrust bearings. The said propeller driving shaft is journaled at its opposite ends by radial and axial thrust bearings that hold the shaft in equilibrium with respect to radial gear thrust and axial propeller thrusts. The said drive shaft is journaled at its remote end, intermediate the ends of the propeller driving shaft, by a radial and axial thrust bearing that steadies the shaft assembly against the impacts and whipping motions and that axially locates the gears relative to the half shell housing, the latter bearing absorbing the axial gear loads independent of the radial support of the drive shaft upon the propeller driving shaft.

It is still another object of this invention to provide a transmisison of the character referred to that is made of but few easily formed and commercially practical parts. The housings and shaft elements are finished with a minimum number of machine cuts and/or operations, and although heat treatment can be used throughout the reverse gears and jaw clutch elements are of separate minimized configuration adapted for hardening and ease of manufacture, durability and ready replacement.

The various objects and features of this invention will be fully understood from the following detailed description of the typical preferred form and application thereof, throughout which description reference is made to the accompanying drawings, in which:

FIG. 1 is a longitudinal sectional view taken vertically through the central plane of the transmission.

FIG. 2 is an enlarged sectional view of the portion of the transmission taken as indicated by line 2—2 on FIG. 1.

And, FIGS. 3 and 4 are transverse sectional views each taken substantially as indicated by lines 3—3 and 4—4 on FIG. 1 respectively.

The transmission is primarily a boat transmission and is either capable of being engaged or disengaged, or of driving forwardly or reversely with a neutral condition therebetween. In its preferred form as shown and described there is propeller driving shaft A controlled for the three functions of forward, neutral and reverse. As is shown, the transmission comprises, generally, a housing H, a housing extension E, a power shaft assembly X, a countershaft assembly Y, a reverse gearing Z, and control means C that determines rotation of the propeller driving shaft A. The propeller driving shaft A is a straight through shaft involved in the countershaft assembly Y together with a drive shaft D, the latter being coaxially journaled over the former. In addition to the drive shaft D, the propeller driving shaft A carries elements of both the reverse gearing Z and the control means C, and all antifriction bearings, spacers, rings and fasteners are initially assembled thereon as a unit, as will later be described. The power shaft assembly X is also initially assembled as a unit, and it is these two units X and Y that are embraced by the housing H of longitudinally split half-shell configuration. The housing extension E is fastened to the housing H to receive and journal one end of the countershaft assembly Y journaled at its other end in the housing H. Further, the housing extension E carries the elements of the reverse gearing Z that cooperate with the reverse gearing elements carried with said shaft assembly, and also carries the control elements of the control means C.

The housing H is, in accordance with the invention, a longitudinally split half-shell case that establishes the frame of the transmission, preferably formed as by casting a pair of mating elements 10 and 11. The housing configuration can vary as circumstances require, a typical V drive case being illustrated. For example, a typical marine power plant installation involves a prime mover disposed on a substantially horizontal axis with its drive end faced forwardly. This arrangement necessarily places the prime mover toward the stern and requires a reversal of the propeller shafting and an angular displacement thereof as well. Consequently, the transmissions employed for this purpose are referred to as V drives and which involve, generally, gear boxes with angularly related input and output shafts. In practice (but not shown) the input shaft is on the axis of the prime mover and coupled thereto by means of a shaft with universal joints; and the output shaft is rearwardly divergent, for instance at 12°, from the input shaft so as to project beneath the prime mover and to pass through a shaft log, etc., to carry and drive a propeller. It is to be understood that the installation can be accomplished to suit circumstances, and accordingly the housing H is angular in configuration with spaced angularly related bores to receive and carry the shaft assemblies X and Y.

The half-shell housing H is split in a vertical plane coincidental with the axes of the two bores therein that carry the assemblies X and Y respectively. There is an upper bore 12 through the housing and comprised of spaced turned openings in the front and rear walls 13 and 14 of the housing. And there is a lower bore 15 through the housing and comprised of a turned opening in the front wall 13', and a clearance opening in the rear wall 14'. Accordingly, the housing extension E is provided and which projects from the rear wall 14' to establish a continuation of the lower bore 15 and comprised of a turned opening in the rear wall 16 thereof. In practice, the last mentioned turned opening is formed in a cover plate 17 that provides stepped seats for the reception of the bearings and seal later described. A boss 18 concentric with the lower bore axis locates the front wall 19 of the extension E upon the rear wall 14' of the housing 8, thereby continuing the chamber defined by the three housing elements, there being open communication through the clearance opening in the wall 14'. The mating elements 10 and 11 of the housing H are coupled by means of transverse fasteners 20, and the housing extension E is then coupled to the half-shell assembly by means of longitudinal fasteners 20', preferably cap-screws threaded into the rear wall 14'.

The power shaft assembly X involves a power shaft 21 journaled on spaced antifriction bearings 22 and 23 seated in the front and rear turned openings of the upper bore 12. The said bearings are retained by a cover plate 24 and a shoulder 25 respectively, and are adapted to absorb both axial and radial thrusts from the drive gear 26. The gear 26 is adjustably positioned on the power shaft 21 by means of suitable shoulders, a lock collar and spacers, as indicated. In practice therefore, the complete power shaft assembly X can be prepared with the bearings 22 and 23 pressed onto the shaft 21, and then embraced between the mated housing elements 10 and 11 which are brought together into the assembled relationship shown.

The countershaft assembly Y which is unique with the present invention involves the propeller driving shaft A with the drive shaft D journaled thereon to carry the driven gear 27, and drive gear of the reverse gearing Z and a control element associated therewith. The propeller driving shaft A is a through shaft in the sense that it extends through the clearance opening in the wall 14', and is journaled on spaced antifriction bearings 28 and 29 seated in the front wall 13' and cover plate 17 respectively. The said bearings are retained by a cover plate 30 and a shoulder 31, respectively, and are adapted to absorb both axial and radial thrusts applied from the propeller thrust and from the driven gear 27. Due to the stepped configuration of the shaft A, a seat ring 32 shoulders against the forward end of the shaft to capture the drive shaft bearings (as shown) and to accommodate the inner race diameter of the front bearing 28. In the case illustrated, the front bearing 28 absorbs forward propeller thrust while the rear bearing 29 absorbs rearward propeller thrust. In practice therefore, the complete countershaft assembly Y including all elements thereon as shown, can be prepared with the bearings 28 and 29 (bearing 29 optionally) pressed onto shaft A, and then embraced between the mated housing elements 10 and 11 which are brought together into the assembled relationship shown.

The drive shaft D that is coaxial with and journaled on the propeller driving shaft A is a tubular shaft centered upon shaft A by means of spaced antifriction bearings 33 and 34, preferably roller or needle bearings adapted to absorb radial thrust, and is part of the countershaft assembly Y. The bearings 33 and 34 are pressed into an open bore 35 to stop against oppositely faced shoulders therein, and the shaft A is provided with a locating shoulder 36 to position bearing 34 while the seat ring 32 positions bearing 33. The bearings 33 and 34 are held spaced on shaft A by split rings 33' and 34', and all of which positions the drive shaft D within the chamber in the housing H and extending forward of wall 14'.

In accordance with the invention the drive shaft D carries the driven gear 27 and extends through the clearance opening in wall 14' to be exposed within the housing extension E. The drive shaft D is positioned and steadied by an antifriction bearing 37 seated in the clearance opening of wall 14', to absorb axial thrust imposed upon shaft D and to prevent lateral deflection of the shaft assembly Y. A channel-shaped seat 38, or the like, is provided to receive and position bearing 37, and the shaft D has a forwardly faced locating shoulder 39 against which the bearing 38 is pressed by a sleeve 40. Driven gear 27 is then pressed onto the splined exterior of the shaft D for driving engagement, and held in position against the sleeve 40 by means of a nut 41 threaded onto the front end portion of shaft D. The length of sleeve 40 (or shims) determine the position of the gear 27. The bearing 38 absorbs axial thrust so as to position the drive shaft D and driven gear 27 within housing H, and to the end that shafts A and D can revolve independently.

The transmission is reversible and accordingly the propeller driving shaft A is controlled for engagement or disengagement and/or for driving forwardly and through a neutral and for driving reversely. Therefore, the control means C and/or reverse gearing Z is provided and which involves dogs 44 at the rear of drive shaft D and a shifting collar 45 slideably splined to shaft A rearward of the drive shaft D and normally positioned centrally within the housing extension E. In practice a pair of circumferentially spaced dogs 44 project axially from a hub 46 pressed and splined to the end of shaft D, and mating dogs 47 project axially from the collar 45 to move into driving engagement with the dogs 44. Collar 45 is formed with an annular shifting groove 48 to move the dogs into and out of engagement. As thus far described, the transmission is useable for "in and out" engagement.

In order to provide for reversibility the reversing means Z is included and which involves a reverse drive gear 50, a reverse driven gear 51, and a reversing gear 52. The three gears are beveled, gears 50 and 51 being coaxial and faced toward each other with the gear 52 operating therebetween on an axis normal to and intersecting to co-axis. As shown, the axis of gears 50 and 51 is coincidental with the axis of shaft A and the drive gear 50 is integral with the above described hub 46, to be driven by the drive shaft D. Accordingly, the driven gear 51 surrounds the propeller driving shaft A as it passes through the rear of housing extension E. Thus, the driven gear has a tubular hub 53 free of the shaft A and journaled in the cover plate 17 by an antifriction bearing 54. Bearing 54 is pressed onto the exterior of tubular hub 53 and is pressed into the seat in cover plate 17, said cover plate having the bearing 23 pressed therein and secured to the housing extension E by means of longitudinal fasteners 20'.

The gears 50 and 51 operate in opposite directions by virtue of the reversing gear 52 that drives therebetween. Gear 52 is journaled on a carrier 55 that closes a side of the housing extension E, by an antifriction bearing 56. Bearing 56 is pressed onto both the hub 53 of the gear 52 and onto the carrier 55 and with shoulders to hold the proper gear engagements.

The control means C involves dogs 60 at the hub 53 of gear 52, to be engaged by mating dogs 65 at the rear end of collar 45. As above described the collar 45 is shiftably splined to the shaft A, and the dogs 65 project axially from the collar to engage the dogs 64 that project axially from the hub of the gear. The dogs are circumferentially spaced to be interengaged to drive the collar 45 from the said gear. As shown, the collar 45 has an intermediate neutral position for disengagement of all dogs, and alternate forward and rear positions for said forward and reverse engagements.

The reversing means C also involves a manually positioned fork 60 that operates in the groove 48 to axially position the collar 45. The fork 60 is carried on a lever 61 operated by a shaft supported on a cover plate 62 that closes a side of the housing extension E. A manual lever 63 is oscillated to shift the fork 60 through said neutral position to said alternate positions as above indicated, and all of which is held in the selected positions by a spring loaded ball detent 64, as shown.

From the foregoing it will be seen that a very practical transmission is provided, especially adapted to use in V drives for boats and the like. In practicing the invention, the shaft assemblies are prepared in their entirety prior to embracement within the confines of the half-shell housing parts 10 and 11, followed by fastening of the housing extension E into its shaft supporting position. In actual practice, the cover plate 17 is prepared as a subassembly with the two bearings thereon and the driven gear of the reverse gearing pressed into position; and this subassembly installed so as to close the rear of the housing. Finally, the carrier 55 and reversing gear 52 are installed as a subassembly, and also the control means C which involves the installation of the cover plate 62. Suitable shims and/or sleeve and spacer lengths can be provided for in order to establish proper gear mesh for quiete operation. And, in the event of repair it is a simple matter to service the housing extension E and the reverse gearing Z and control means C therein; gearing Z and means C being completely accessible for repair and replacement of parts without distributing the primary drive gearing within the housing elements 10 and 11. This serviceability includes the replacement of all bearings and gears relegated to the reversibility. And in the event that the primary drive gearing requires service, it is a simple matter to remove the two major shaft assemblies upon separation of the housing elements 10 and 11, followed by replacement and/or repair of essential parts as circumstances require.

Having described my invention, I claim:

1. A transmission comprised of a housing, a power shaft assembly, a countershaft assembly, and a control means for driving engagement and disengagement of said countershaft assembly; said housing including an upper bore with spaced turned openings in front and rear walls, and a lower bore with a turned opening in the front wall and a clearance opening in the rear wall, and having a rearward extension with a rear wall and a turned opening therein concentric with said lower bore; said power shaft assembly journaled on spaced bearings seated in the turned openings of the upper bore respectively and having a drive gear therebetween; said countershaft assembly including a driving shaft journaled on spaced bearings seated in the turned openings of the lower bore respectively, and a tubular drive shaft journaled on bearings upon the driving shaft to revolve independently thereof and having a driven gear meshed with the first mentioned drive gear; and said control means comprising a clutch in said extension of the housing to engage and disengage the driving shaft from the drive shaft.

2. The transmission as set forth in claim 1 and wherein said housing is divided on a plane coincidental with the axes of the upper and lower bores and fastened together embracing the two shaft assemblies.

3. The transmission as set forth in claim 1 and wherein said housing is divided on a plane coincidental with the axes of the upper and lower bores and fastened together with the bearings seated in the turned openings thereof and embracing the two shaft assemblies, and wherein the housing extension is fastened onto the said embracing housing with the rearmost bearing of the driving shaft seated in the turned opening thereof.

4. The transmission as set forth in claim 1 and wherein said housing is divided on a plane coincidental with the axes of the upper and lower bores and fastened together with the bearings seated in the turned openings thereof and embracing the two shaft assemblies, wherein the housing extension is fastened onto the said embracing housing with the rearmost bearing of the driving shaft seated in the turned opening thereof, and wherein a bearing is seated in the clearance opening of the housing and journaling the drive shaft to steady the same and the driving shaft upon which the drive shaft is journaled.

5. The transmission as set forth in claim 1 and wherein said housing is divided on a plane coincidental with the axes of the upper and lower bores and fastened together with the bearings seated in the turned openings thereof and embracing the two shaft assemblies, wherein the housing extension is fastened onto the said embracing housing with the rearmost bearing of the driving shaft seated in the turned opening thereof, and wherein a bearing is seated in a channel in the clearance opening of the housing and journaling the drive shaft for axial positioning of the driven gear and to radially steady the same and the driving shaft upon which the drive shaft is radially journaled.

6. The transmission as set forth in claim 1, wherein the spaced bearings journaling the driving shaft absorb the radial and axial thrusts, wherein the spaced bearings journaling the drive shaft absorb the radial thrust, and wherein a bearing is seated in the clearance opening of the housing and journaling the drive shaft to steady the same and the driving shaft upon which the drive shaft is journaled.

7. The transmission as set forth in claim 1, wherein the spaced bearings journaling the driving shaft absorb the radial and axial thrusts, wherein the spaced bearings journaling the drive shaft absorb the radial thrust, and wherein a bearing is seated in a channel in the clearance opening of the housing and journaling the drive shaft absorbing the radial and axial thrusts for axial positioning of the driven gear and the radial steadying of the driven gear and driving shaft upon which the drive shaft is radially journaled.

8. The transmission as set forth in claim 1 and wherein the clutch of the control means includes a replaceable engagement element fixed on said drive shaft, and an axially shiftable engagement element driveably engaged on said driving shaft and movable into and out of engagement with the first mentioned engagement element.

9. A reversible transmission comprised of a housing, a power shaft assembly, a countershaft assembly, a reverse gearing, and a control means for forward neutral and reverse engagement of said countershaft assembly; said housing including an upper bore with spaced turned openings in front and rear walls, and a lower bore with a turned opening in the front wall and a clearance opening in the rear wall, and having a rearward extension with a rear wall and a turned opening therein concentric with said lower bore; said power shaft assembly journaled on spaced bearings seated in the turned openings of the upper bore respectively and having a drive gear therebetween; said countershaft assembly including a driving shaft journaled on spaced bearings seated in the turned openings of the lower bore respectively, and a tubular drive shaft journaled on bearings upon the driving shaft to revolve independently thereof and having a driven gear meshed with the first mentioned drive gear; said reverse gearing including a drive gear fixed on said drive shaft and faced into the housing extension, a driven gear coaxial with and opposed to the drive gear and having a tubular hub journaled in the housing extension, and a reversing gear journaled in the housing extension between and meshed with the drive gear and driven gear so that they revolve oppositely; and said control means including opposed clutch elements on the drive gear and driven gear, and an axially shiftable element driveably engaged on said driving shaft and alternately movable into and out of engagement with said opposed clutch elements.

10. The reversible transmission as set forth in claim 9 and wherein said housing is divided on a plane coincidental with the axes of the upper and lower bores and fastened together embracing the two shaft assemblies.

11. The reversible transmission as set forth in claim 9 and wherein said housing is divided on a plane coincidental with the axes of the upper and lower bores and fastened together with the bearings seated in the turned openings thereof and embracing the two shaft assemblies, and wherein the housing extension is fastened onto the said embracing housing with the rearmost bearing of the driving shaft seated in the turned opening thereof.

12. The reversible transmission as set forth in claim 9 and wherein said housing is divided on a plane coincidental with the axes of the upper and lower bores and fastened together with the bearings seated in the turned openings thereof and embracing the two shaft assemblies, wherein the housing extension is fastened onto the said embracing housing with the rearmost bearing of the driving shaft seated in the turned opening thereof, and wherein a bearing is seated in the clearance opening of the housing and journaling the drive shaft to steady the same and the driving shaft upon which the drive shaft is journaled.

13. The reversible transmission as set forth in claim 9 and wherein said housing is divided on a plane coincidental with the axes of the upper and lower bores and fastened together with the bearings seated in the turned openings thereof and embracing the two shaft assemblies, wherein the housing extension is fastened onto the said embracing housing with the rearmost bearing of the driving shaft seated in the turned opening thereof, and wherein a bearing is seated in a channel in the clearance opening of the housing and journaling the drive shaft for axial positioning of the driven gear and to radially steady the same and the driving shaft upon which the drive shaft is radially journaled.

14. The reversible transmission as set forth in claim 9, wherein the spaced bearings journaling the driving shaft absorb the radial and axial thrusts, wherein the spaced bearings journaling the drive shaft absorb the radial thrust, and wherein a bearing is seated in the clearance opening of the housing and journaling the drive shaft to steady the same and the driving shaft upon which the drive shaft is journaled.

15. The reversible transmission as set forth in claim 9, wherein the spaced bearings journaling the driving shaft absorb the radial and axial thrusts, wherein the spaced bearings journaling the drive shaft absorb the radial thrust, and wherein a bearing is seated in a channel in the clearance opening of the housing and journaling the drive shaft absorbing the radial and axial thrusts for axial positioning of the first mentioned driven gear and the radial steadying of the drive shaft and driving shaft upon which the drive shaft is radially journaled.

16. The reversible transmission as set forth in claim 9, wherein the last mentioned drive gear is replaceable on said drive shaft, and wherein the opposed clutch elements are integral with the last mentioned drive gear and driven gear respectively.

References Cited

UNITED STATES PATENTS

| | | | |
|---|---|---|---|
| 1,548,917 | 8/1925 | Vincent | 74—417 X |
| 2,708,416 | 5/1955 | Schmitter | 74—379 X |

LEONARD H. GERIN, Primary Examiner

U.S. Cl. X.R.

74—417, 606; 115—34